(12) United States Patent
Choi et al.

(10) Patent No.: US 12,476,325 B2
(45) Date of Patent: Nov. 18, 2025

(54) CELL ASSEMBLY UNIT AND BATTERY PACK INCLUDING THE SAME

(71) Applicant: SK ON CO., LTD., Seoul (KR)

(72) Inventors: Ha Neul Choi, Daejeon (KR); Min Song Kang, Daejeon (KR); Jeong Woon Ko, Daejeon (KR); Bon Seok Ku, Daejeon (KR); Byeong Jun Pak, Daejeon (KR); Ja Sung Yun, Daejeon (KR); Jun Hee Jung, Daejeon (KR); Hyun Jae Jung, Daejeon (KR); Sei Hoon Cho, Daejeon (KR); Jin Su Han, Daejeon (KR); Jae Il Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 597 days.

(21) Appl. No.: 17/897,277

(22) Filed: Aug. 29, 2022

(65) Prior Publication Data
US 2023/0067336 A1    Mar. 2, 2023

(30) Foreign Application Priority Data
Aug. 30, 2021    (KR) .................. 10-2021-0115127

(51) Int. Cl.
*H01M 50/30*    (2021.01)
*H01M 10/613*    (2014.01)
(Continued)

(52) U.S. Cl.
CPC ....... *H01M 50/394* (2021.01); *H01M 10/613* (2015.04); *H01M 10/625* (2015.04);
(Continued)

(58) Field of Classification Search
CPC ............ H01M 50/394; H01M 50/211; H01M 50/227; H01M 50/249; H01M 50/264; H01M 50/367; H01M 50/383; H01M 50/502; H01M 50/503; H01M 50/505; H01M 50/517; H01M 50/548;
(Continued)

(56) References Cited

U.S. PATENT DOCUMENTS

2008/0137290 A1    6/2008  Tanaka et al.
2018/0301773 A1*  10/2018  Sugiyama ............ H01M 50/24
(Continued)

FOREIGN PATENT DOCUMENTS

CN    211404602 U    9/2020
JP    4246600 B2    4/2009
(Continued)

*Primary Examiner* — Eugenia Wang
(74) *Attorney, Agent, or Firm* — The Webb Law Firm

(57) ABSTRACT

A battery pack includes a cell assembly unit including a plurality of battery cells and a bus bar configured to electrically connect the plurality of battery cells, a frame unit accommodating the cell assembly unit, and a bracket unit fixing the cell assembly unit to the frame unit. The bracket unit and the frame unit form a flow path through which a gas is discharged. A reverse flow prevention member is disposed between the bus bar and the bracket unit. The reverse flow prevention member includes a plurality of gas permeation holes, each of which extends from one end facing the bus bar and leads to another end facing the flow path.

10 Claims, 5 Drawing Sheets

(51) Int. Cl.
| | |
|---|---|
| *H01M 10/625* | (2014.01) |
| *H01M 10/647* | (2014.01) |
| *H01M 10/653* | (2014.01) |
| *H01M 10/658* | (2014.01) |
| *H01M 50/211* | (2021.01) |
| *H01M 50/227* | (2021.01) |
| *H01M 50/249* | (2021.01) |
| *H01M 50/264* | (2021.01) |
| *H01M 50/367* | (2021.01) |
| *H01M 50/383* | (2021.01) |
| *H01M 50/502* | (2021.01) |
| *H01M 50/503* | (2021.01) |
| *H01M 50/505* | (2021.01) |
| *H01M 50/517* | (2021.01) |
| *H01M 50/548* | (2021.01) |
| *H01M 50/557* | (2021.01) |

(52) U.S. Cl.
CPC ....... *H01M 10/647* (2015.04); *H01M 10/653* (2015.04); *H01M 10/658* (2015.04); *H01M 50/211* (2021.01); *H01M 50/227* (2021.01); *H01M 50/249* (2021.01); *H01M 50/264* (2021.01); *H01M 50/367* (2021.01); *H01M 50/383* (2021.01); *H01M 50/502* (2021.01); *H01M 50/503* (2021.01); *H01M 50/505* (2021.01); *H01M 50/517* (2021.01); *H01M 50/548* (2021.01); *H01M 50/557* (2021.01); *H01M 2200/00* (2013.01); *H01M 2220/20* (2013.01)

(58) Field of Classification Search
CPC ............. H01M 50/557; H01M 50/229; H01M 50/522; H01M 50/562; H01M 10/613; H01M 10/625; H01M 10/647; H01M 10/653; H01M 10/658; H01M 2200/00; H01M 2220/20
See application file for complete search history.

(56) References Cited

U.S. PATENT DOCUMENTS

| | | |
|---|---|---|
| 2019/0097192 A1 | 3/2019 | Kim et al. |
| 2021/0305546 A1 | 9/2021 | Chang et al. |
| 2022/0006139 A1 | 1/2022 | Yoo et al. |
| 2022/0115737 A1 | 4/2022 | Shin et al. |

FOREIGN PATENT DOCUMENTS

| | | | | |
|---|---|---|---|---|
| JP | 2015118811 | A | 6/2015 | |
| KR | 102061872 | B1 | 1/2020 | |
| KR | 20210004189 | A | 1/2021 | |
| WO | 2006112266 | A1 | 10/2006 | |
| WO | 2020246721 | A1 | 12/2020 | |
| WO | WO-2021002626 | A1 * | 1/2021 | ............... A62C 3/16 |

* cited by examiner

CELL ASSEMBLY UNIT AND BATTERY PACK INCLUDING THE SAME

CROSS REFERENCE TO RELATED APPLICATION

This application claims priority to Korean Patent Application No. 10-2021-0115127 filed Aug. 30, 2021, the disclosure of which is hereby incorporated by reference in its entirety.

BACKGROUND OF THE INVENTION

Field of the Invention

The present disclosure relates to a cell assembly unit and a battery pack including the same.

Description of Related Art

As technology development and demand for mobile devices and electric vehicles increase, a demand for battery cells (secondary battery cells) as an energy source is rapidly increasing. A battery cell is a battery capable of repeating charging and discharging because an interconversion between chemical energy and electrical energy is reversible.

A plurality of battery modules, each of which is mounted with a plurality of battery cells, may be mounted on an electric vehicle to implement a battery pack.

Recently, when battery cells are installed in the electric vehicle, a technology (called Cell-to-Pack (CTP) technology) has been presented to omit a process of manufacturing and installing battery modules mounted with the battery cells and form a battery pack by directly installing the battery cells in the electric vehicle.

However, the battery cells generate heat while going through charging and discharging. Hence, there is a problem in that any one of the battery cells explodes due to an increase in a temperature of the battery cell or any one of the battery cells explodes due to an external shock.

Flames, gases, etc. caused by such an explosion propagate heat to other battery cells or other battery packs through the flow, and eventually all the battery cells in the electric vehicle explode, causing damage to users and surroundings.
(Patent Document 1) KR 10-2061872 B1

SUMMARY OF THE INVENTION

An object of the present disclosure is to address the above-described and other problems.

Another object of the present disclosure is to provide a cell assembly unit and a battery pack including the same capable of smoothly discharging a flame or gas caused by an explosion of a battery cell and capable of preventing heat propagation by heat conduction.

In order to achieve the above-described and other objects and needs, in one aspect of the present disclosure, there is provided a battery pack comprising a cell assembly unit including a plurality of battery cells and a bus bar configured to electrically connect the plurality of battery cells; a frame unit accommodating the cell assembly unit; a bracket unit fixing the cell assembly unit to the frame unit, wherein the bracket unit and the frame unit form a flow path through which a gas is discharged; and a reverse flow prevention member disposed between the bus bar and the bracket unit, the reverse flow prevention member including a plurality of gas permeation holes, each of which extends from one end facing the bus bar and leads to another end facing the flow path.

In another aspect of the present disclosure, there is provided a cell assembly unit comprising: a plurality of battery cells each including an electrode tab and arranged along one direction; a bus bar disposed at one side of the plurality of battery cells and electrically connected to the electrode tabs; an insulating cover disposed at one side of the bus bar and configured to insulate the bus bar; and a reverse flow prevention member coupled to one of the bus bar and the insulating cover, wherein the reverse flow prevention member allows a gas generated in at least one of the plurality of battery cells to be discharged to an outside of the insulating cover and blocks the gas from being introduced from the outside of the insulating cover to the plurality of battery cells.

According to an aspect of the present disclosure, the present disclosure can provide a cell assembly unit and a battery pack including the same capable of securing a safety against the risk of explosion by preventing heat propagation by heat conduction when thermal runaway occurs.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DESCRIPTION OF THE INVENTION

Figure 1:
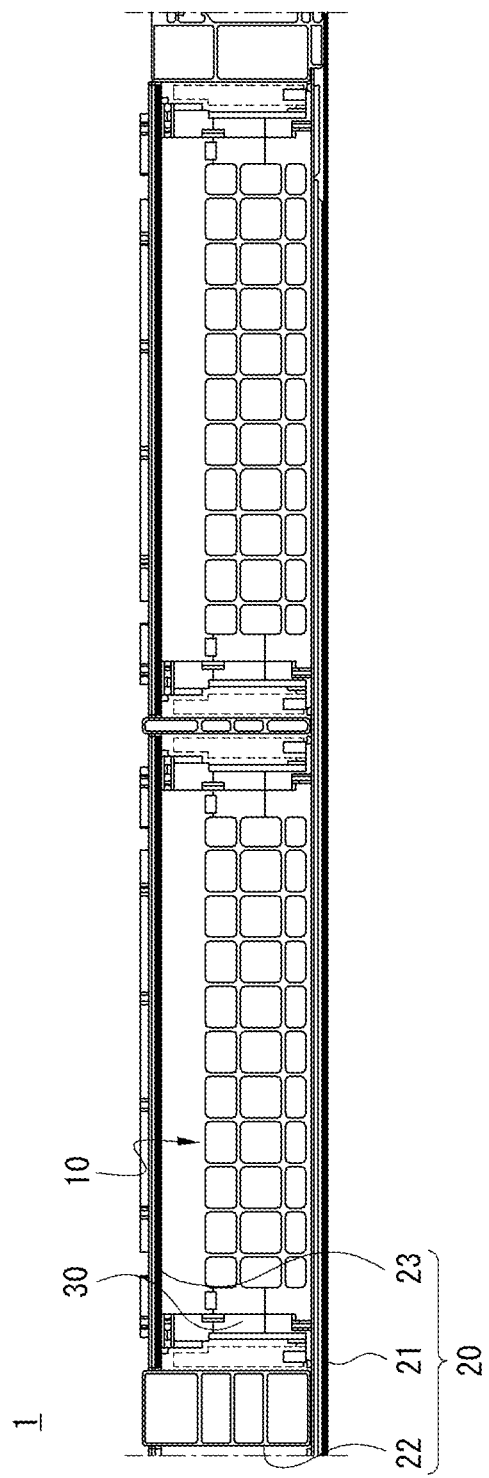
FIG. 1 is a side cross-sectional view of a battery pack according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the present disclosure includes both the case where layers, areas, and components are directly electrically connected, and the case where layers, areas, and components are indirectly electrically connected to other layers, areas, and components intervening between them.

The present disclosure relates to a battery pack and can secure a flow path capable of smoothly discharging a flame or a high-temperature gas generated by an explosion of a battery cell, in a battery pack, in which battery cells are directly installed, in a vehicle or the like.

In another aspect, a battery pack according to the present disclosure can present configuration capable of preventing heat propagation by preventing a gas discharged in any one battery cell from being introduced into another battery cell in a thermal runaway situation.

Figure 2A:
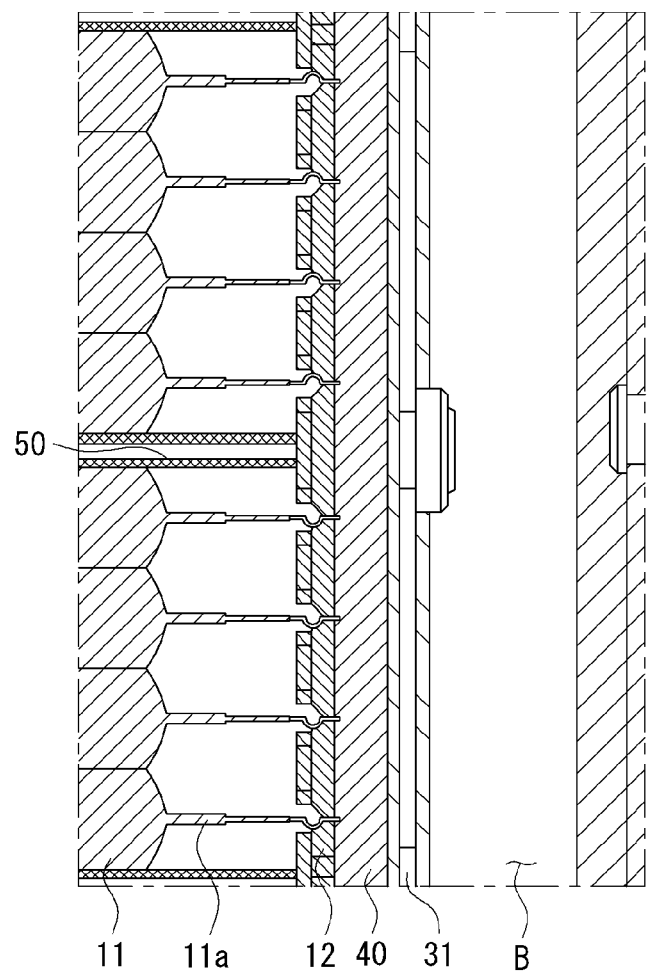
FIG. 2a is a cross-sectional view illustrating that a reverse flow prevention member and a bracket unit are coupled to a cell assembly unit.
Figure 2B:
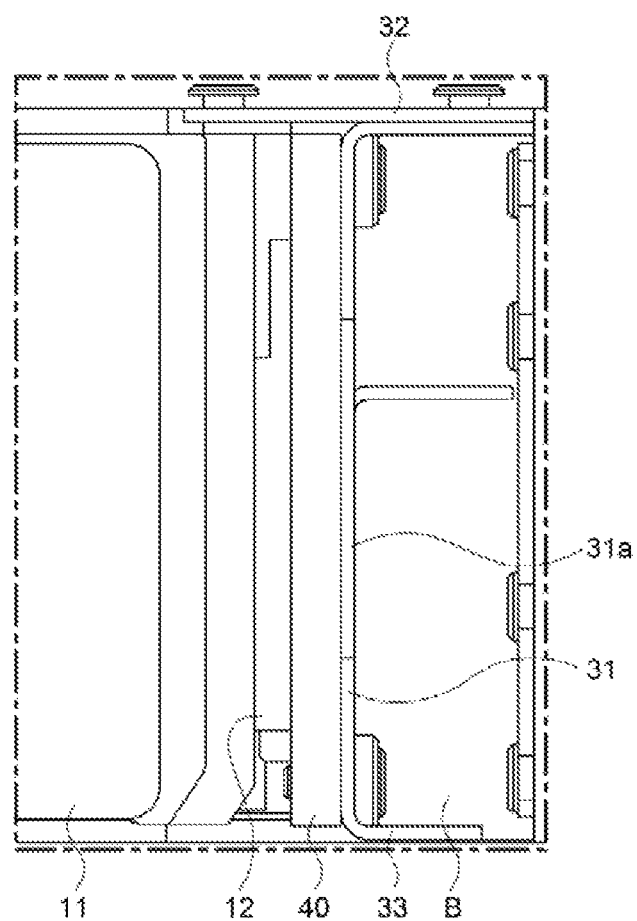
FIG. 2b illustrates that a reverse flow prevention member and a bracket unit are coupled to a cell assembly unit.
Figure 3:
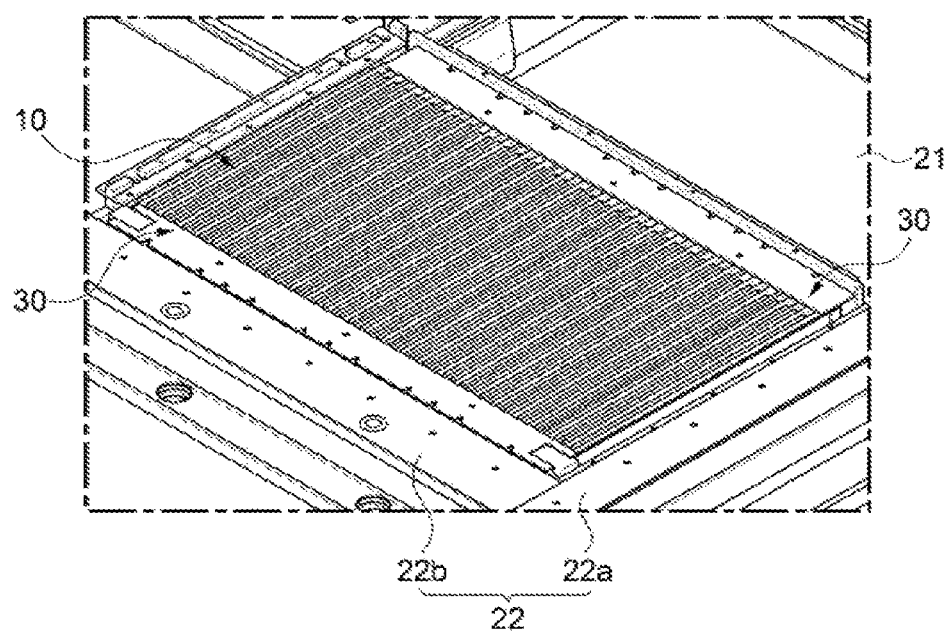
FIG. 3 is a perspective view of a battery pack according to an embodiment of the present disclosure.
Figure 4:
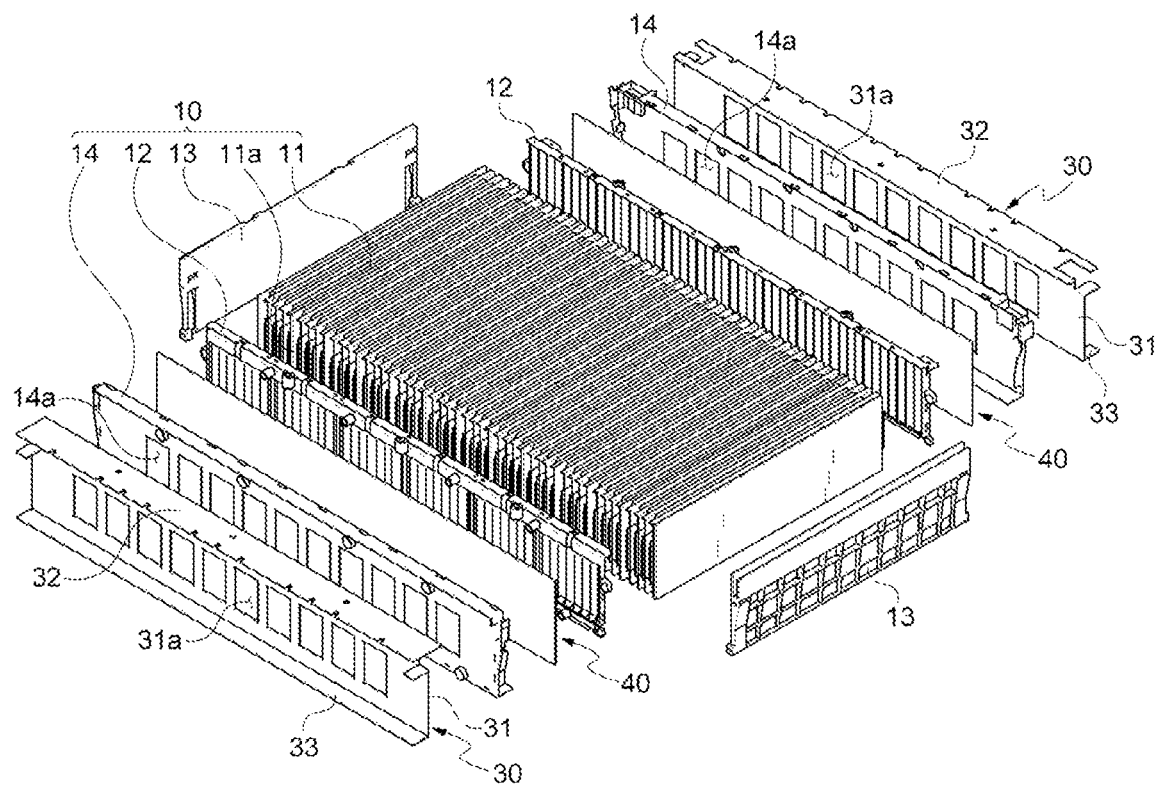
FIG. 4 is an exploded perspective view of a battery pack according to an embodiment of the present disclosure.

Referring to FIGS. 1 to 4, a battery pack 1 according to an embodiment of the present disclosure may include a cell assembly unit 10, a frame unit 20, and a bracket unit 30.

The cell assembly unit 10 may include a plurality of battery cells 11 that are arranged to be stacked in one direction. The frame unit 20 may accommodate the cell assembly unit 10.

The bracket unit 30 may be coupled to the frame unit 20. The bracket unit 30 may fix the cell assembly unit 10 to the frame unit 20. The bracket unit 30 may form a flow path B together with the frame unit 20.

When a flame or a gas is generated in any one of the plurality of battery cells 11, the flow path B may be a path for discharging the flame or the gas. For example, the flow path B may be a passage or a path through which gas flows.

The battery pack 1 according to an embodiment of the present disclosure may include a reverse flow prevention member 40. The reverse flow prevention member 40 may selectively discharge the flame or the gas to the flow path B.

For example, the bracket unit 30 may be coupled to the cell assembly unit 10 and may couple the cell assembly unit 10 to the frame unit 20. The bracket unit 30 may prevent the cell assembly unit 10 from being detached. For example, the cell assembly unit 10 may not be detached from the frame unit 20 by catching on the bracket unit 30.

That is, the bracket unit 30 can simultaneously perform a function of forming the flow path B and a function of fixing the cell assembly unit 10. Therefore, an existing problem of a reduction in an energy density caused by separately providing the configuration for forming the flow path B and the configuration for fixing the battery cells 11 can be solved through the bracket unit 30 according to an embodiment of the present disclosure. Hence, the present disclosure has an advantage in that the energy density can be increased by installing a relatively large number of battery cells 11.

The cell assembly unit 10 may include the plurality of battery cells 11. The cell assembly unit 10 may include a bus bar 12 and a side cover 13 that electrically connect the plurality of battery cells 11 to each other.

The battery cell 11 may include an electrode assembly and an exterior material surrounding the electrode assembly.

The electrode assembly may substantially contain an electrolyte and may be accommodated in the exterior material together with the electrolyte. The electrolyte may include an organic solvent such as ethylene carbonate (EC), propylene carbonate (PC), diethyl carbonate (DEC), ethyl methyl carbonate (EMC), and dimethyl carbonate (DMC), and a lithium salt such as $LiPF_6$ and $LiBF_4$. The electrolyte may be a liquid, solid or gel phase.

The exterior material may protect the electrode assembly and accommodate the electrolyte. For example, the exterior material may be a pouch-shaped member or a can-shaped member. A pouch-shaped battery cell, a can-shaped battery cell, etc. are merely an example of the battery cell 11 accommodated in the battery pack 1 according to the present disclosure. The battery cell 11 accommodated in the battery pack 1 according to the present disclosure is not limited to the battery cells described above.

The frame unit 20 may accommodate the cell assembly unit 10. The frame unit 20 airtightly accommodates the periphery of the cell assembly unit 10, and thus can prevent a flame or gas generated by the explosion of any one of the battery cells 11 included in the cell assembly unit 10 from being discharged to the outside. In this case, the flame or the gas may be guided to the flow path B formed by the frame unit 20 and the bracket unit 30 and may be discharged to the outside.

For example, the frame unit 20 may accommodate a plurality of cell assembly units 10, and may provide a plurality of compartments in which the respective cell assembly units 10 are sealed. To this end, the frame unit 20 according to an embodiment of the present invention may include a lower frame 21, a side frame 22, and an upper frame 23.

The cell assembly unit 10 may be placed on the lower frame 21. The lower frame 21 may face a lower part of the cell assembly unit 10. A lower end of the side frame 22 may be coupled to the lower frame 21. The side frame 22 may surround the side of the cell assembly unit 10 in a perimeter direction. The side frame 22 and the bracket unit 30 may form the flow path B. The side frame 22 may correspond to a side surface of the cell assembly unit 10. The upper frame 23 may be coupled to an upper end of the side frame 22. The upper frame 23 may cover the cell assembly unit 10. The upper frame 23 may face an upper part of the cell assembly unit 10.

The cell assembly unit 10 may be placed on the lower frame 21. An area of the lower frame 21 may be divided by the side frame 22 so that the plurality of cell assembly units 10 can be isolated from each other. The lower frame 21 is one frame on which all the plurality of cell assembly units 10 are placed. The side frame 22 may divide the lower frame 21 into a plurality of areas (compartments), each of which accommodates each cell assembly unit 10.

For example, the lower frame 21 may be a frame included in a floor portion below a boarding area of a vehicle frame. In order to improve a heat dissipation performance, a heat conducting member may be interposed between the cell assembly unit 10 and the lower frame 21. For example, the heat conducting member may be applied between the cell assembly unit 10 and the lower frame 21.

The side frame 22 may surround the periphery of the cell assembly unit 10. To this end, the lower end of the side frame 22 may be coupled to an upper surface of the lower frame 21. The side frame 22 may divide the lower frame 21 into a plurality of areas. For example, the side frame 22 may be disposed to form compartments corresponding to a plurality of rectangular areas on the upper surface of the lower frame 21.

The side frame 22 according to an embodiment of the present disclosure may include a first side frame 22a and a second side frame 22b.

The first side frame 22a may be disposed on one side of the cell assembly unit 10. The second side frame 22b may be disposed on another side of the cell assembly unit 10.

The bracket unit 30 may be disposed between the second side frame 22b and the cell assembly unit 10. The bracket unit 30 and the second side frame 22b may form the flow path B. That is, the second side frame 22b may form a part of the flow path B, and the bracket unit 30 may form a remaining part of the flow path B.

The upper frame 23 may cover upper parts of a predetermined number of battery cells 11 on a per number basis. Thus, a space inside the compartment formed by the frame unit 20 can be sealed. To this end, the upper frame 23 may be coupled to the upper end of the side frame 22 and an upper end of the bracket unit 30.

At least one thermal diffusion prevention member 50 may be disposed between the plurality of battery cells 11. The thermal diffusion prevention member 50 is disposed between the battery cells 11 that are adjacent to each other, and thus can block heat from being diffused between the battery cells 11 that are adjacent to each other.

The bracket unit 30 according to an embodiment of the present disclosure may include a support plate portion 31 that faces the side of the cell assembly unit 10 and is disposed in parallel to the bus bar 12, an upper flange portion 32 positioned at an upper end of the support plate portion 31, and a lower flange portion 33 positioned at a lower end of the support plate portion 31.

For example, the upper flange portion 32 may extend from an upper end of the support plate portion 31 toward the second side frame 22b, or may extend toward the second side frame 22b and the cell assembly unit 10 in both directions. The upper flange portion 32 may be fastened to the second side frame 22b. Hence, the cell assembly unit 10 may be fixed to the frame unit 20.

The upper flange portion 32 may be coupled to the upper frame 23. For example, the upper flange portion 32, the second side frame 22b, and the upper frame 23 may be coupled through one bolt. Hence, the present disclosure can reduce the coupling process time by reducing the number of bolt coupling operations.

The lower flange portion 33 may extend from the lower end of the support plate portion 31 toward the second side frame 22b. The lower flange portion 33 may allow the support plate portion 31 to be placed and supported on the lower frame 21.

The support plate portion 31 may have a through hole 31a that communicates between a space, in which the cell assembly unit 10 is disposed, and the flow path B. A plurality of through holes 31a may be provided. The plurality of through holes 31a may be arranged along a longitudinal direction of the support plate portion 31. A shape of the through hole 31a may include a quadrangle, a circle, or other polygonal shapes. The through hole 31a may be positioned or formed between the reverse flow prevention member 40 and the flow path B.

The through hole 31a is formed in the support plate portion 31, and thus the flame or gas generated in any one battery cell 11 may be discharged to the flow path B. That is, the flame or the gas may pass through the through hole 31a and may be introduced into the flow path B.

For example, the bracket unit 30 may have heat resistance and/or fire resistance characteristics. For example, the bracket unit 30 may be formed of a material, such as a metal, a resin, a composite material, and a fiber-reinforced composite material, having rigidity of about 0.5 GPa or more. Accordingly, the bracket unit 30 can secure rigidity for fixing the cell assembly unit 10 to the frame unit 20 while forming the flow path B. In addition, the bracket unit 30 may be manufactured by going through post-processing such as coating and/or heat treatment in order to reinforce heat resistance and/or fire resistance and/or rigidity.

A shape of the reverse flow prevention member 40 according to an embodiment of the present disclosure may have a pad shape. The reverse flow prevention member 40 may be made of a heat resistant material with air permeability. The reverse flow prevention member 40 may extend in parallel to the support plate portion 31 of the bracket unit 30 along the bus bar 12 of the cell assembly unit 10. For example, the reverse flow prevention member 40 may be disposed between the bus bar 12 and the bracket unit 30. Accordingly, the reverse flow prevention member 40 may selectively pass through the flame or the gas so that the flame or the gas flows in one direction.

For example, since a plurality of "gas permeation holes" are formed in the reverse flow prevention member 40, the reverse flow prevention member 40 may have air permeability (or gas permeability). The gas permeation hole of the reverse flow prevention member 40 may extend from one end and lead to the other end. For example, one end of the gas permeation hole may be opened facing the bus bar 12. For example, the other end of the gas permeation hole may be opened toward the flow path B. For example, the other end of the gas transmission hole may face the through hole 31a and communicate with the through hole 31a.

A cross-sectional size of each of the plurality of gas permeation holes (not shown) of the reverse flow prevention member 40 may be smaller than the size of the flow path B. Here, a cross section of each of the plurality of gas permeation holes (not shown) may mean a cross section obtained by cutting the gas permeation hole (not shown) perpendicular to a longitudinal direction of the gas permeation hole (not shown). The longitudinal direction of the gas permeation hole (not shown) may be a direction from one end of the gas permeation hole (not shown) toward the other end.

That is, when thermal runaway due to explosion occurs in any one of the plurality of battery cells 11, a gas generated inside the battery cells 11 may pass through a small space between the bus bars 12 and may be rapidly discharged. Therefore, a flow rate of the gas can increase, and thus the gas can pass through the reverse flow prevention member 40 with a strong pressure.

The gas that has passed through the reverse flow prevention member 40 may pass through the through hole 31a of the bracket unit 30 and may be introduced into the flow path B, which is a wide space. A density and a velocity of the gas in the flow path B may be less than a density and a velocity of the gas in the reverse flow prevention member 40, respectively. That is, a pressure (atmospheric pressure) in the flow path B may be less than a pressure (atmospheric pressure) in the reverse flow prevention member 40.

Accordingly, it may be difficult for the gas positioned in the flow path B to pass through the reverse flow prevention member 40 and enter the battery cell 11. That is, the gas in the flow path B does not pass through the reverse flow prevention member 40 and enter the battery cell 11, and can be discharged to the outside along the flow path B.

In other words, the reverse flow prevention member 40 can allow the gas to be introduced from the cell assembly unit 10 to the flow path B and can block the gas from reversely flowing from the flow path B into the cell assembly unit 10.

As described above, the battery pack 1 according to the present disclosure includes the reverse flow prevention member 40, and thus can selectively pass through the gas so that the gas flows in only one direction. Hence, when thermal runaway occurs in any one compartment, the battery pack 1 according to the present disclosure can prevent heat from being propagated to other compartments after only the battery cells 11 in the corresponding compartment are burned out.

The cell assembly unit 10 may include the bus bar 12 to which electrode leads 11a of the plurality of battery cells 11 are coupled, an insulating cover 14 covering the bus bar 12, the side cover 13 covering outermost side portions of the plurality of battery cells 11, and the reverse flow prevention member 40 coupled to the bus bar 12 or the insulating cover 14.

The bus bar 12 may be coupled to the plurality of battery cells 11. The bus bar 12 may support all the plurality of battery cells 11. To this end, the bus bar 12 may include a plurality of coupling holes (not shown) coupled to the electrode leads 11a of the battery cells 11.

The bus bar 12 may be connected to an electrode strip (not shown). The bus bar 12 may transfer electrical energy generated in the plurality of battery cells 11 to the electrode strip (not shown), and the electrode strip may supply the electrical energy to an external device (not shown) such as an electric vehicle. For example, the external device is not limited to the electric vehicle and may include a power tool, an electric bicycle, urban air mobility (UAM), an energy storage system (ESS), and the like.

The insulating cover 14 may cover and protect the bus bar 12. For example, the insulating cover 14 may insulate between the bus bar 12 and an external metal structure. The insulating cover 14 may be disposed between the reverse flow prevention member 40 and the support plate portion 31.

The reverse flow prevention member 40 may be disposed between the bus bar 12 and the insulating cover 14. The reverse flow prevention member 40 may extend along the bus bar 12 or the insulating cover 14. The reverse flow prevention member 40 may be formed to discharge the flame or gas generated in the battery cell 11 to the flow path B. To this end, the reverse flow prevention member 40 may be made of a flame retardant material.

The reverse flow prevention member 40 may allow the gas generated in one of the plurality of battery cells 11 to be discharged to the outside of the insulating cover 14 and may block the gas positioned outside the insulating cover 14 from being introduced into the plurality of battery cells 11.

In order to discharge the gas generated in the battery cell 11 to the flow path B, the insulating cover 14 may have an open hole 14a corresponding to the through hole 31a. A position on the open hole 14a may correspond to a position where the through hole 31a is formed.

A plurality of opening holes 14a may be provided. The plurality of open holes 14a may be arranged along a longitudinal direction of the insulating cover 14. The number of open holes 14a may correspond to the number of through holes 31a.

The side cover 13 may be provided to pack the plurality of battery cells 11 in association with the insulating cover 14 and the bracket unit 30. For example, the side cover 13 may cover the outermost side portions of the stacked plurality of battery cells 11 to protect the battery cells 11.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

The invention claimed is:

1. A battery pack comprising:
 a cell assembly unit including a plurality of battery cells and a bus bar configured to electrically connect the plurality of battery cells;
 a frame unit accommodating the cell assembly unit;
 a bracket unit fixing the cell assembly unit to the frame unit, wherein the bracket unit and the frame unit form a flow path through which a gas is discharged; and
 a reverse flow prevention member disposed between the bus bar and the bracket unit, the reverse flow prevention member including a plurality of gas permeation holes, each of which extends from one end facing the bus bar and leads to another end facing the flow path; and wherein the bracket unit includes a through hole positioned between the reverse flow prevention member and the flow path.

2. The battery pack of claim 1, wherein the reverse flow prevention member extends along the bus bar and is made of a heat resistant material.

3. The battery pack of claim 1, wherein when a thermal runaway occurs in at least one of the plurality of battery cells to generate the gas, a pressure inside the reverse flow prevention member is greater than a pressure inside the flow path.

4. The battery pack of claim 1, wherein the bracket unit includes:
   a support plate portion disposed in parallel to the bus bar;
   an upper flange portion disposed at an upper end of the support plate portion; and
   a lower flange portion disposed at a lower end of the support plate portion,
   wherein the through hole is formed to pass through the support plate portion.

5. The battery pack of claim 4, wherein the through hole includes a plurality of through holes, and
   wherein the plurality of through holes are arranged along a longitudinal direction of the support plate portion.

6. The battery pack of claim 4, further comprising an insulating cover between the reverse flow prevention member and the support plate portion,
   wherein the insulating cover includes an open hole corresponding to the through hole.

7. The battery pack of claim 6, wherein the open hole includes a plurality of open holes, and
   wherein the plurality of open holes are arranged along a longitudinal direction of the insulating cover.

8. The battery pack of claim 1, wherein the frame unit includes:
   a lower frame on which the cell assembly unit is placed;
   a side frame corresponding to a side of the cell assembly unit, wherein the side frame and the bracket unit form the flow path; and
   an upper frame configured to cover the cell assembly unit.

9. The battery pack of claim 8, wherein a heat conducting member is applied between the cell assembly unit and the lower frame.

10. The battery pack of claim 1, further comprising at least one thermal diffusion prevention member placed between the plurality of battery cells.

* * * * *